Patented Mar. 3, 1925.

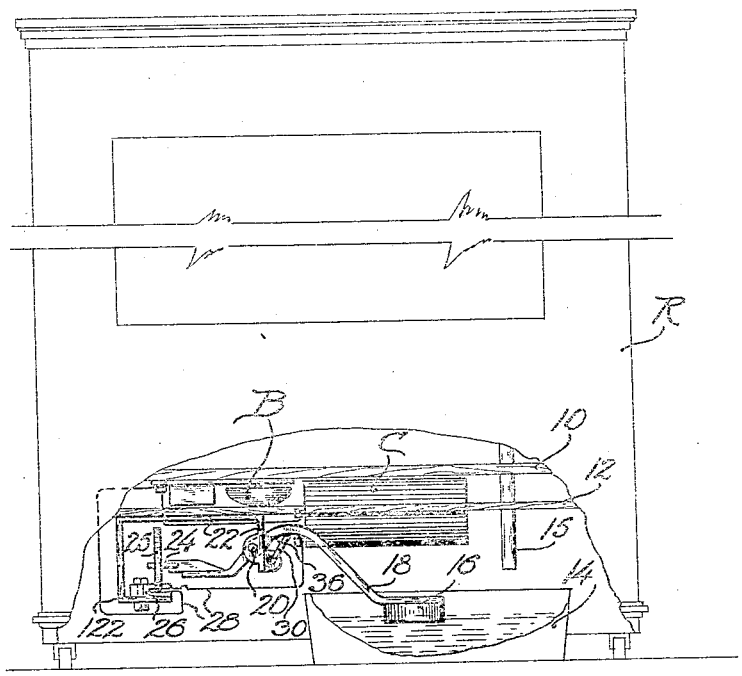
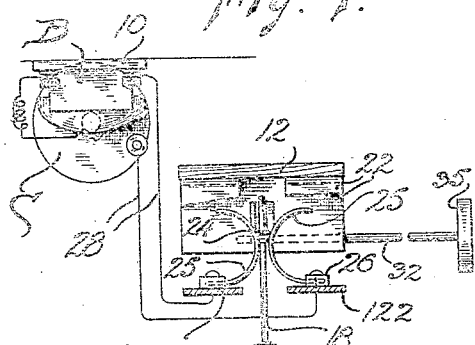
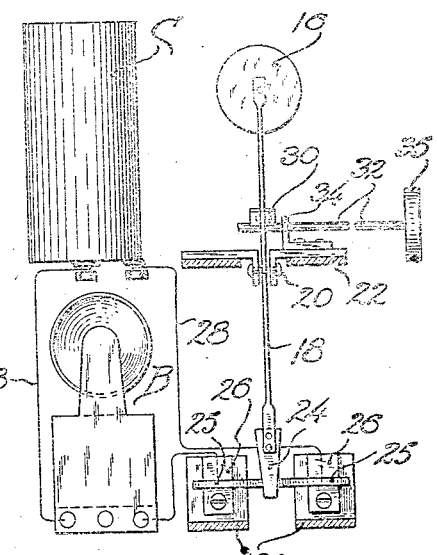
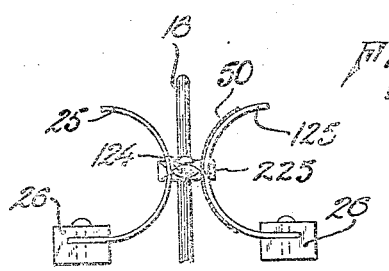

1,528,103

UNITED STATES PATENT OFFICE.

JAMES P. DICKSON, OF DENVER, COLORADO.

OVERFLOW ALARM FOR REFRIGERATOR DRIP PANS.

Application filed February 21, 1921. Serial No. 446,606.

*To all whom it may concern:*

Be it known that I, JAMES P. DICKSON, a citizen of the United States, residing at the city and county of Denver and State of Colorado, have invented certain new and useful Improvements in Overflow Alarms for Refrigerator Drip Pans; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide an alarm adapted to be installed upon refrigerators which will be operated by the water dripping into a drip pan, so as to signal when the level in the pan is approaching the overflow point.

Briefly, the invention comprises a float adapted to operate an arm carrying a bridging finger adapted to engage two contacts and close an electric circuit to ring a bell.

In the drawings:

Fig. 1 is an elevation of the invention as installed on the bottom of a refrigerator;

Fig. 2 is an end view of the operative parts;

Fig. 3 is a plan thereof; and

Fig. 4 shows a modified form of contact mechanism.

The refrigerator R is provided with a pair of cross members 10 and 12 for supporting the parts of the alarm, and a pan 14 is shown in position therebeneath to receive drip water from a drain pipe 15 on the refrigerator. A float 16 is secured to one end of a bent lever 18 pivoted at 20 in a framework 22 secured to the lower cross member 12. The opposite end of the lever 18 carries a bridging finger 24 adapted to be moved between two spaced spring contacts 25 carried upon the lower portion 122 of the framework 22 by means of insulating blocks 26, the bridging finger 24 being also insulated from its support on the arm 18. Electric conducting wires 28 connect the spring contacts 25 with an electric bell, indicated in general at B, and with an electric dry cell C, said bell and cell being secured to the cross member 10.

The drawings show the bridging finger 24 in position to engage both of the spring contacts 25 to complete the circuit and ring the bell, the water level in the pan 14 approaching the top thereof. The bell will continue to ring until the pan has been removed, unless said pan is not removed for a considerable length of time, whereupon the rising level in the pan will cause contact 24 to be moved out of engagement with the contacts 25 so as to break the circuit. The pan is deep enough to accomplish this. When the water level in the pan 14 is below the point indicated in Figure 1, the float will fall and the bridging finger 24 will rise above the position shown, so as to disengage the spring contacts 25. It is also desirable when the pan is being removed to raise the float above the pan and to bring the contact 24 below and out of engagement with spring contacts 25. For this purpose a key 30 is provided upon a spindle 32 journaled in the bracket 34 mounted upon the framework 22, the forward end of the spindle 32 projecting from the front of the refrigerator and being operable by a knob 35. Said key 30 is adapted to be turned by the knob 35 from the position shown in Figure 1 toward the left so as to elevate the float 16 and the corresponding arm of the lever 18, the free end of said key 30 thus engaging under a small shoulder 36 provided on said lever 18 adjacent the pivoting point 20 so as to maintain said lever in elevated non-operative position.

In case it is desired to use a larger pan so that the movable contact moves more slowly, it would be necessary to reduce that part of the path of engagement of the moving contact with the fixed contacts where the circuit is closed. For this purpose, one of the fixed contacts indicated at 125 in Figure 4 is covered with insulation 50, except where a projection 225 on said contact 125 extends through the insulation and is exposed. In conjunction with this, the moving contact 124 is provided with knife edges, so that the engagement of one edge thereof with the projection 225 where it is exposed through the insulation 50, will be for a comparatively short interval. Such a construction will permit the bell to ring sufficiently long to warn the occupants of the house that the pan is about to overflow, but will be insufficient to exhaust the dry cell C in the event that the warning is not heeded, or that there is no one at home. Likewise, the same result will be produced with the construction of Figure 1, if the pan 14 is not so large that engagement of contact 24 with spring contacts 25 does not take place for so long an interval as to exhaust the cell.

I claim:

A float-operated switch for use with drip pan alarms, comprising a pair of spaced oppositely curved contacts having their convex sides opposing each other, one of said contacts having its convex side covered with insulation except at one point which extends through the insulation and provides a contact portion; a movable contact adapted to be moved between said curved contacts and to close a circuit when it passes said conducting portion; and a float-operated mechanism for moving the movable contact.

In testimony whereof I affix my signature.

JAMES P. DICKSON.